US012634820B2

(12) United States Patent
Abotabl et al.

(10) Patent No.: US 12,634,820 B2
(45) Date of Patent: May 19, 2026

(54) OVERWRITING RULES OF NETWORK ENERGY STATES

(71) Applicant: QUALCOMM Incorporated, San Diego, CA (US)

(72) Inventors: Ahmed Attia Abotabl, San Diego, CA (US); Hung Dinh Ly, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 18/047,638

(22) Filed: Oct. 18, 2022

(65) Prior Publication Data

US 2024/0187985 A1     Jun. 6, 2024

(51) Int. Cl.
*H04W 52/02* (2009.01)
(52) U.S. Cl.
CPC ............................... *H04W 52/0216* (2013.01)
(58) Field of Classification Search
None
See application file for complete search history.

(56) References Cited

U.S. PATENT DOCUMENTS

| | | | | |
|---|---|---|---|---|
| 2023/0094063 A1* | 3/2023 | Si | ...................... | H04W 52/0235 |
| | | | | 455/517 |
| 2023/0388923 A1* | 11/2023 | Baek | ................. | H04W 52/0206 |
| 2023/0389120 A1* | 11/2023 | Babaei | .............. | H04W 52/0235 |
| 2024/0244524 A1* | 7/2024 | Bala | ................... | H04W 52/0229 |
| 2025/0048259 A1* | 2/2025 | Liu | ................... | H04W 52/0258 |

FOREIGN PATENT DOCUMENTS

WO      WO-2024035327 A1 *   2/2024    ........ H04W 52/0216

* cited by examiner

*Primary Examiner* — Jamaal Henson
(74) *Attorney, Agent, or Firm* — ArentFox Schiff, LLP

(57) ABSTRACT

Example implementations include a method, apparatus and computer-readable medium of wireless communication by a user equipment, comprising receiving a first configuration indicating a scheduled time at which a signal is to be communicated between the apparatus and a network entity, the scheduled time being within a time interval associated with a first network energy state of the network entity. The implementations further include receiving a second configuration mapping the signal with a second network energy state of the network entity. The implementations further include receiving or transmitting the signal at the scheduled time while the network entity is in the second network energy state based on the second configuration.

26 Claims, 17 Drawing Sheets

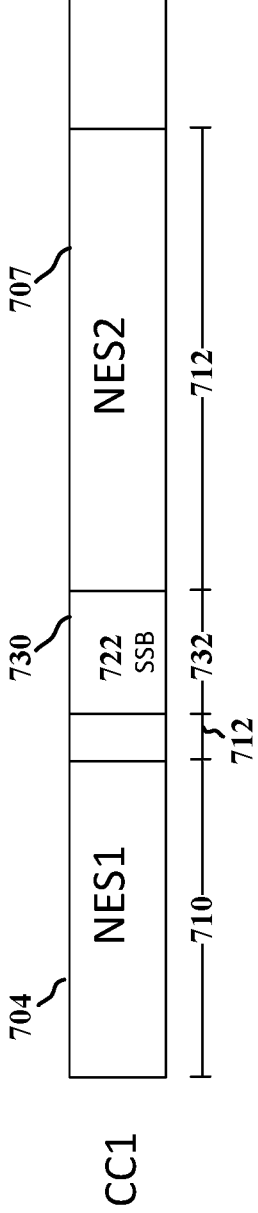
FIG. 7

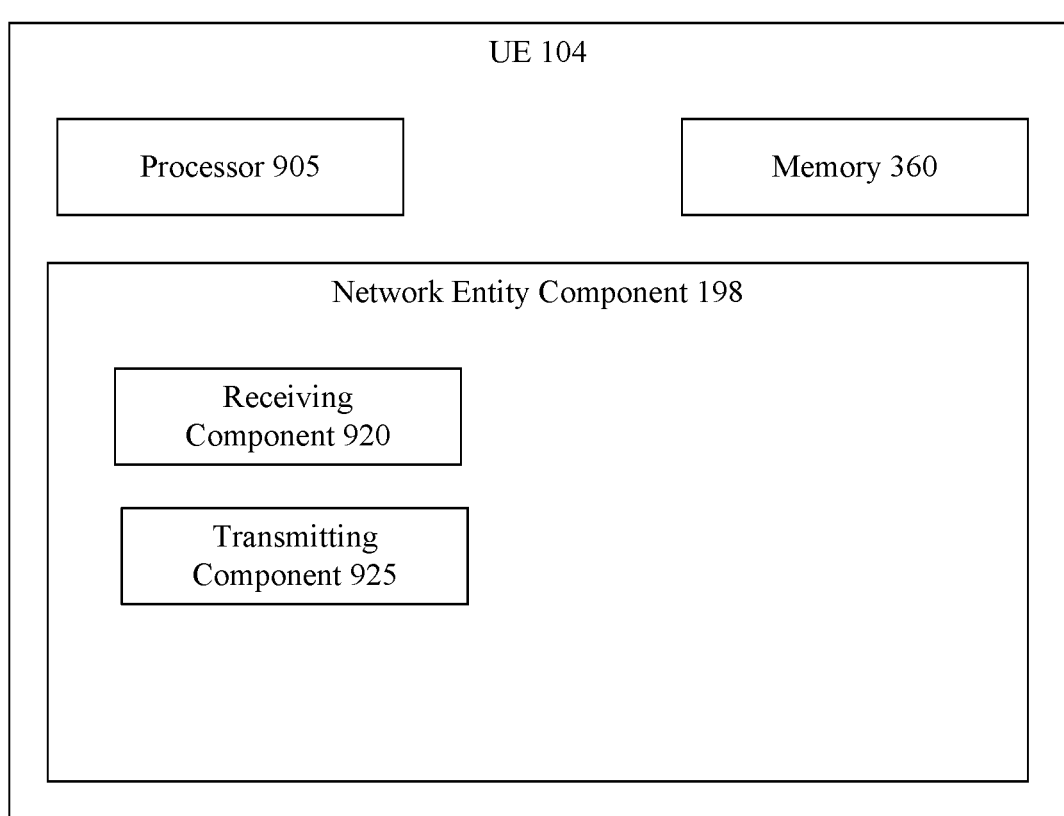
FIG. 9

1000

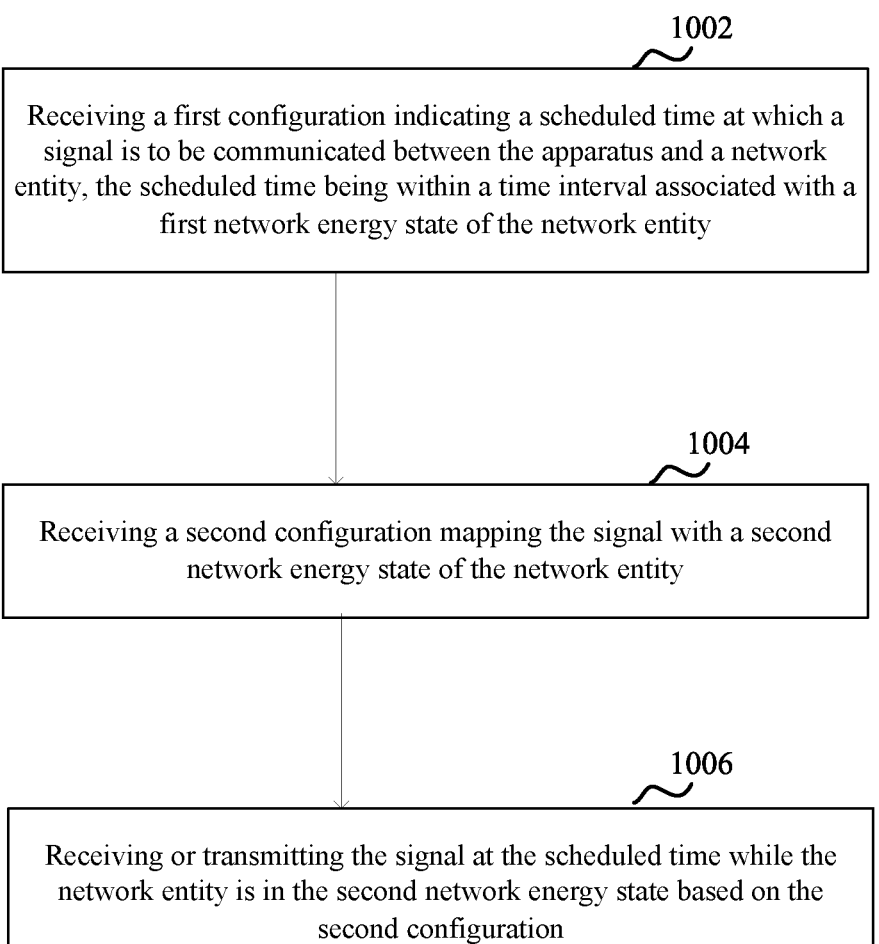

1002

Receiving a first configuration indicating a scheduled time at which a signal is to be communicated between the apparatus and a network entity, the scheduled time being within a time interval associated with a first network energy state of the network entity

1004

Receiving a second configuration mapping the signal with a second network energy state of the network entity

1006

Receiving or transmitting the signal at the scheduled time while the network entity is in the second network energy state based on the second configuration

Figure 11:
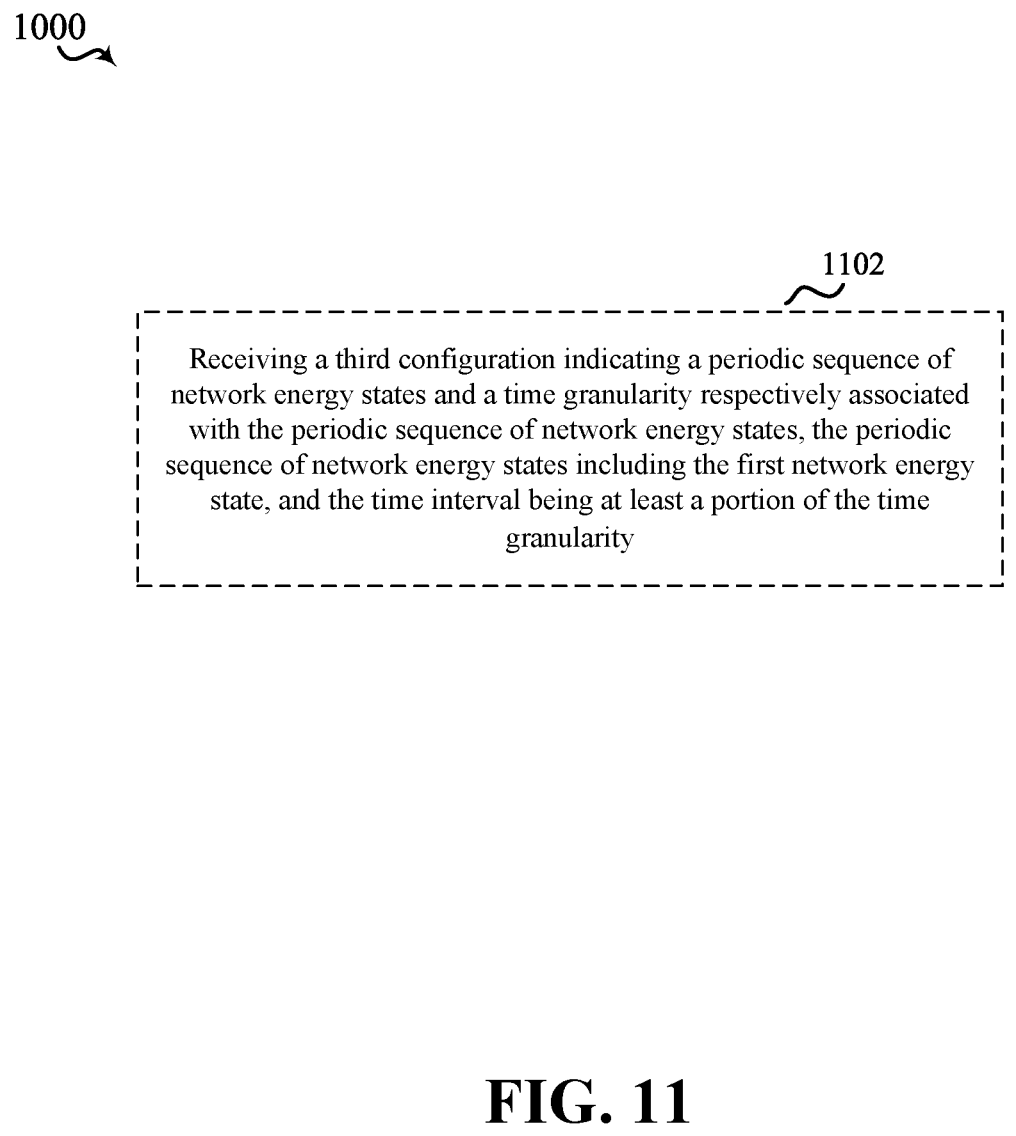

Receiving a third configuration indicating a periodic sequence of network energy states and a time granularity respectively associated with the periodic sequence of network energy states, the periodic sequence of network energy states including the first network energy state, and the time interval being at least a portion of the time granularity

Figure 12:
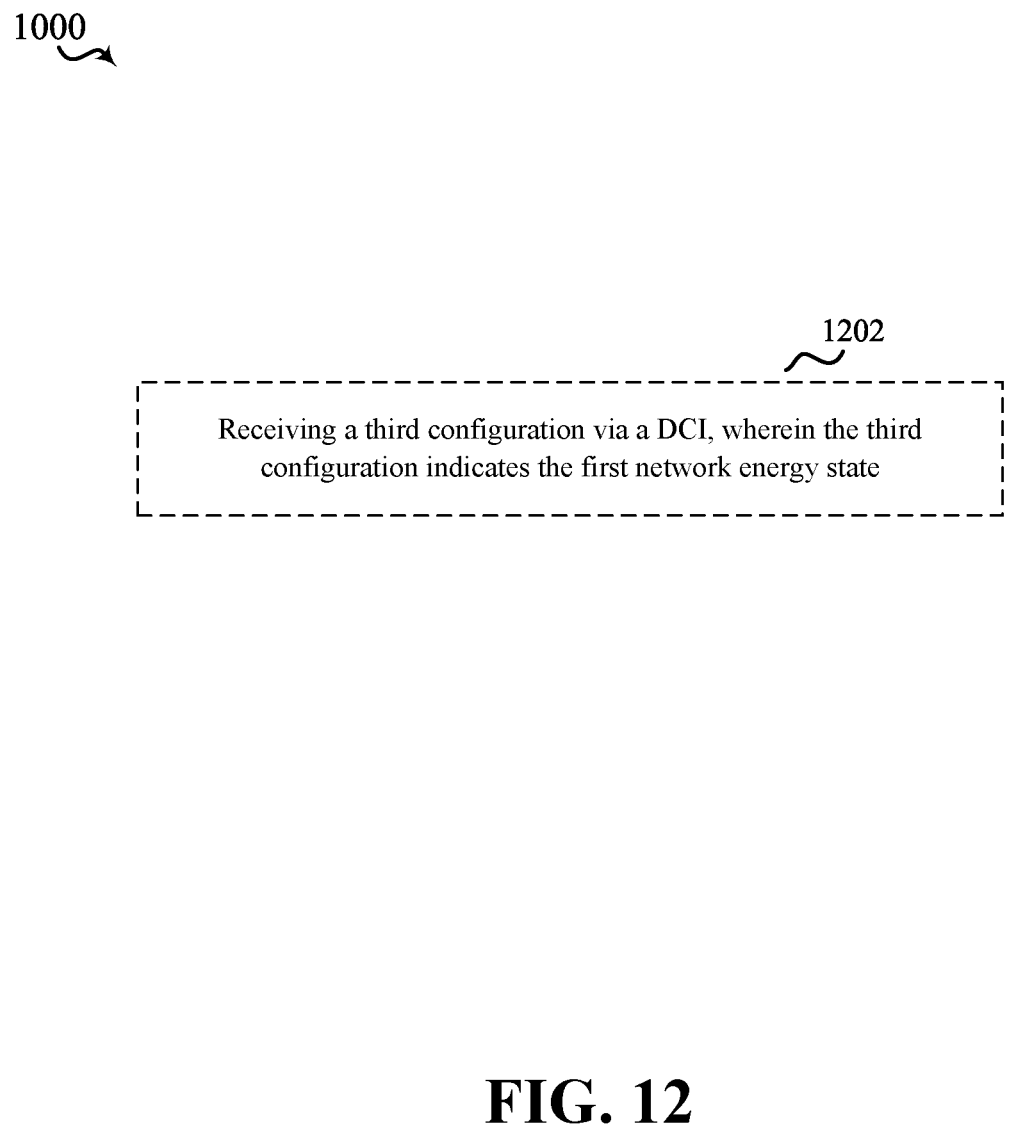

Receiving a third configuration via a DCI, wherein the third
configuration indicates the first network energy state

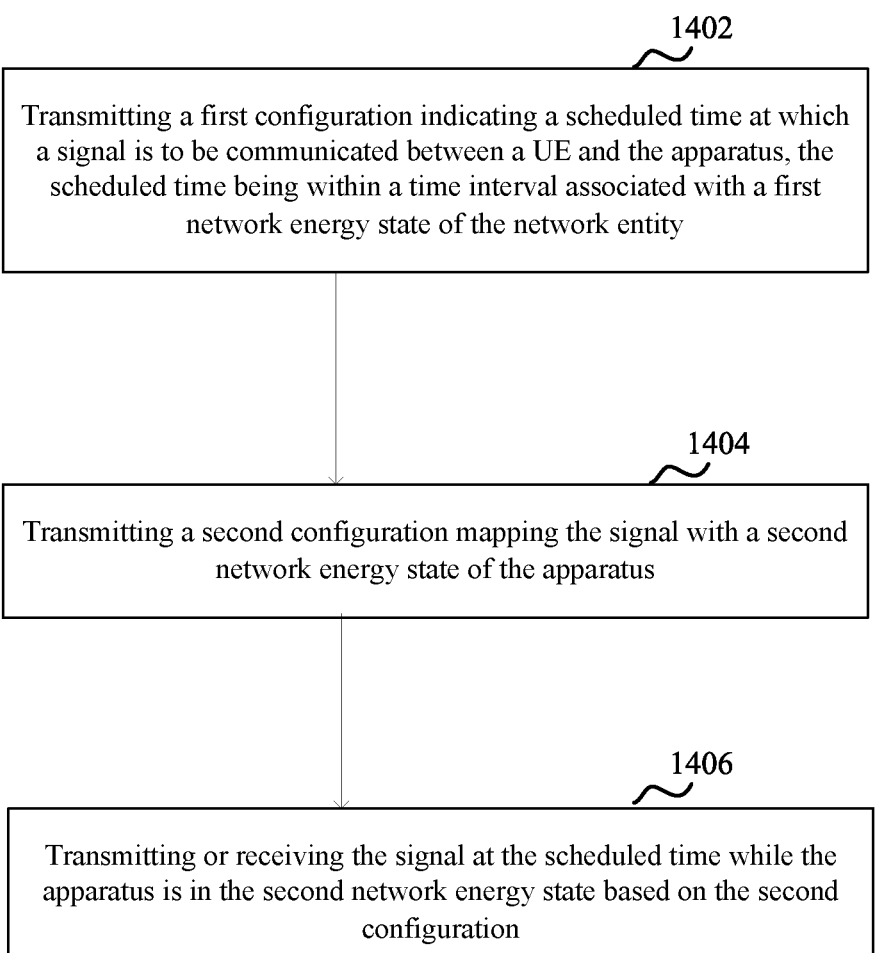

1402

Transmitting a first configuration indicating a scheduled time at which a signal is to be communicated between a UE and the apparatus, the scheduled time being within a time interval associated with a first network energy state of the network entity

1404

Transmitting a second configuration mapping the signal with a second network energy state of the apparatus

1406

Transmitting or receiving the signal at the scheduled time while the apparatus is in the second network energy state based on the second configuration

Figure 15:
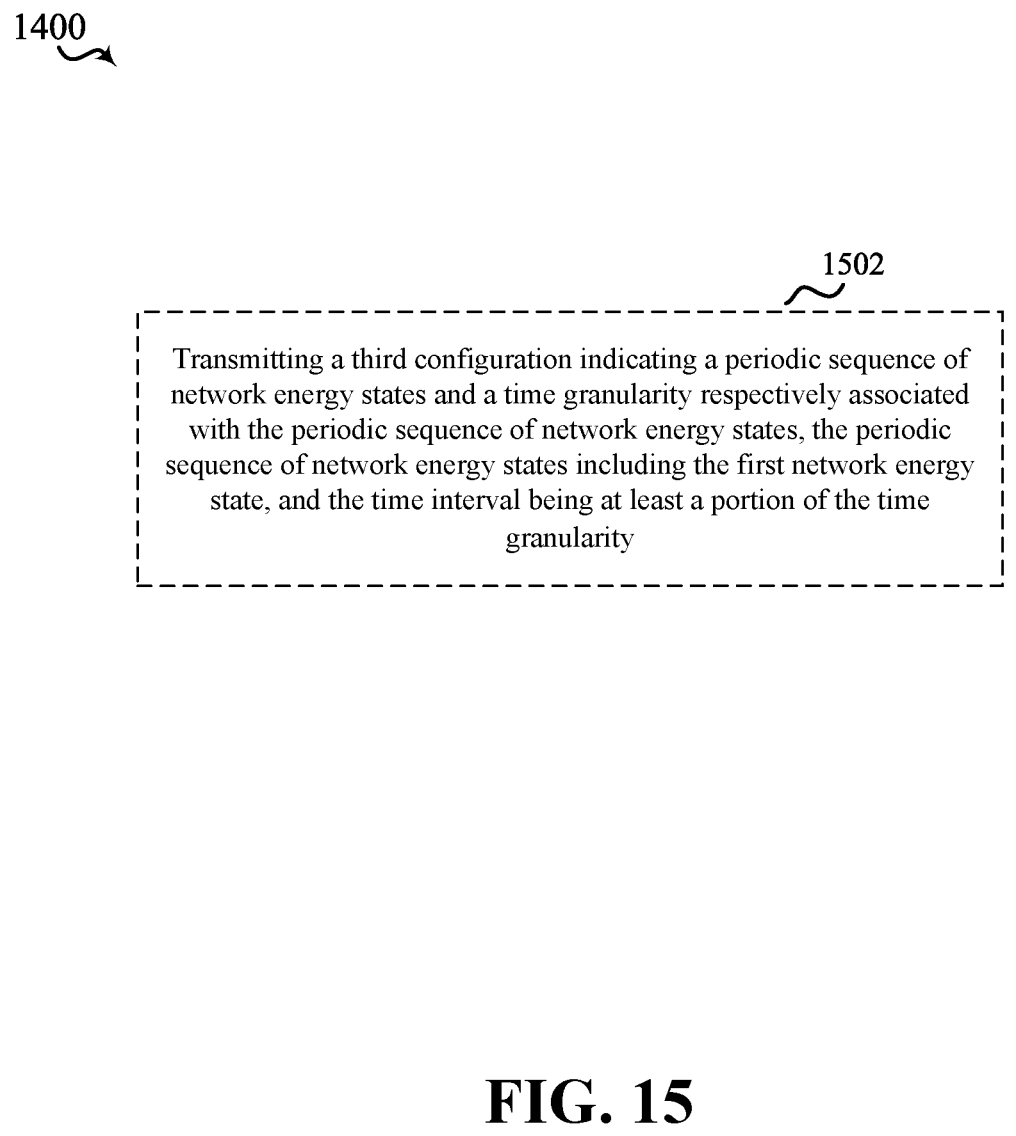

Transmitting a third configuration indicating a periodic sequence of network energy states and a time granularity respectively associated with the periodic sequence of network energy states, the periodic sequence of network energy states including the first network energy state, and the time interval being at least a portion of the time granularity

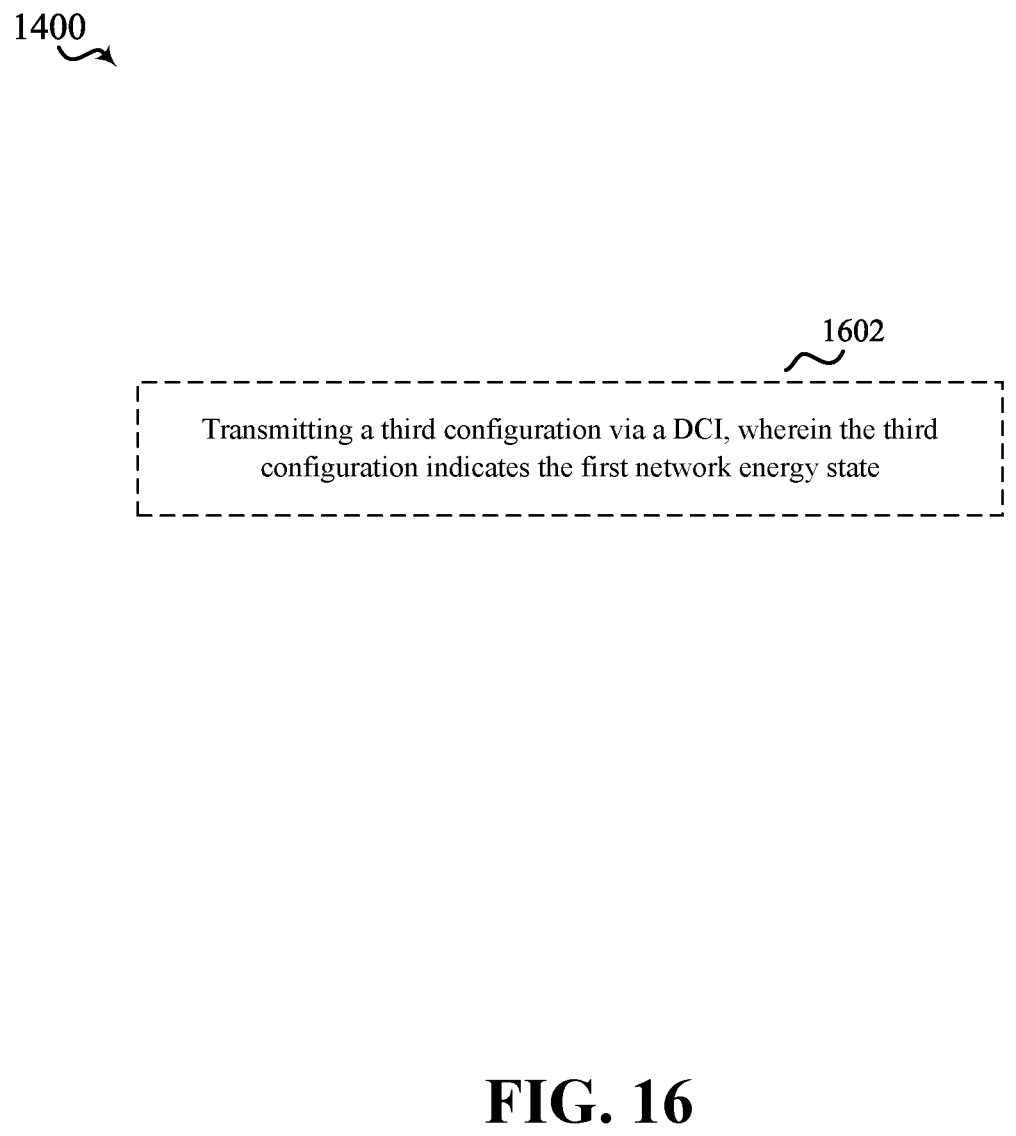

Transmitting a third configuration via a DCI, wherein the third configuration indicates the first network energy state

FIG. 16

OVERWRITING RULES OF NETWORK ENERGY STATES

BACKGROUND

Technical Field

The present disclosure generally relates to communication systems, and more particularly, to network energy states.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology. These improvements may also be applicable to other multi-access technologies and the telecommunication standards that employ these technologies. For instance, improvements to efficiency and latency relating to mobility of user equipments (UEs) communicating with network entities are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communication at a user equipment. In some examples, the method includes receiving a first configuration indicating a scheduled time at which a signal is to be communicated between the UE and a network entity, the scheduled time being within a time interval associated with a first network energy state of the network entity. Additionally, in some examples, the method further includes, receiving a second configuration mapping the signal with a second network energy state of the network entity. Additionally, in some examples, the method further includes, receiving or transmitting the signal at the scheduled time while the network entity is in the second network energy state based on the second configuration.

Certain aspects are directed to a method for wireless communication at a network entity. In some examples, the method includes transmitting a first configuration indicating a scheduled time at which a signal is to be communicated between a User Equipment (UE) and the network entity, the scheduled time being within a time interval associated with a first network energy state of the network entity. Additionally, in some examples, the method further includes, transmitting a second configuration mapping the signal with a second network energy state of the network entity. Additionally, in some examples, the method further includes transmitting or receiving the signal at the scheduled time while the network entity is in the second network energy state based on the second configuration.

Certain aspects are directed to an apparatus configured for wireless communication, comprising a processor, a memory coupled with the processor, and instructions stored in the memory, when executed by the processor, cause the apparatus to receive a first configuration indicating a scheduled time at which a signal is to be communicated between the apparatus and a network entity, the scheduled time being within a time interval associated with a first network energy state of the network entity. In some examples, the instructions, when executed by the processor, further cause the apparatus to receive a second configuration mapping the signal with a second network energy state of the network entity. In some examples, the instructions, when executed by the processor, further cause receive or transmit the signal at the scheduled time while the network entity is in the second network energy state based on the second configuration.

Certain aspects are directed to an apparatus configured for wireless communication, comprising a processor, a memory coupled with the processor, and instructions stored in the memory, when executed by the processor, cause the apparatus to transmit a first configuration indicating a scheduled time at which a signal is to be communicated between a User Equipment (UE) and the apparatus, the scheduled time being within a time interval associated with a first network energy state of the apparatus. In some examples, the instructions, when executed by the processor, further cause the apparatus to transmit a second configuration mapping the signal with a second network energy state of the apparatus. In some examples, the instructions, when executed by the processor, further cause transmit or receive the signal at the scheduled time while the apparatus is in the second network energy state based on the second configuration.

Certain aspects are directed to a non-transitory computer-readable medium having instructions stored thereon that, when executed by an apparatus, cause the apparatus to perform operations comprising receiving a first configuration indicating a scheduled time at which a signal is to be communicated between the UE and a network entity, the scheduled time being within a time interval associated with a first network energy state of the network entity. Additionally, in some examples, the operations include, receiving a second configuration mapping the signal with a second network energy state of the network entity. Additionally, in some examples, the operations include, receiving or transmitting the signal at the scheduled time while the network entity is in the second network energy state based on the second configuration.

Certain aspects are directed to a non-transitory computer-readable medium having instructions stored thereon that, when executed by an apparatus, cause the apparatus to perform operations comprising transmitting a first configuration indicating a scheduled time at which a signal is to be communicated between a User Equipment (UE) and the network entity, the scheduled time being within a time interval associated with a first network energy state of the network entity. Additionally, in some examples, the operations include, transmitting a second configuration mapping the signal with a second network energy state of the network entity. Additionally, in some examples, the operations include transmitting or receiving the signal at the scheduled time while the network entity is in the second network energy state based on the second configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a diagram illustrating another example of a scheduled signal during a time interval associated with a network energy state, in accordance with present disclosure.

FIG. 9 is a diagram illustrating an example of a hardware implementation for an example apparatus.

FIG. 10 is a flowchart of a method of wireless communication.

FIG. 11 is a flowchart of a method of wireless communication.

FIG. 12 is a flowchart of a method of wireless communication.

FIG. 14 is a flowchart of a method of wireless communication.

FIG. 15 is a flowchart of a method of wireless communication.

FIG. 16 is a flowchart of a method of wireless communication.

DETAILED DESCRIPTION

Figure 1A:
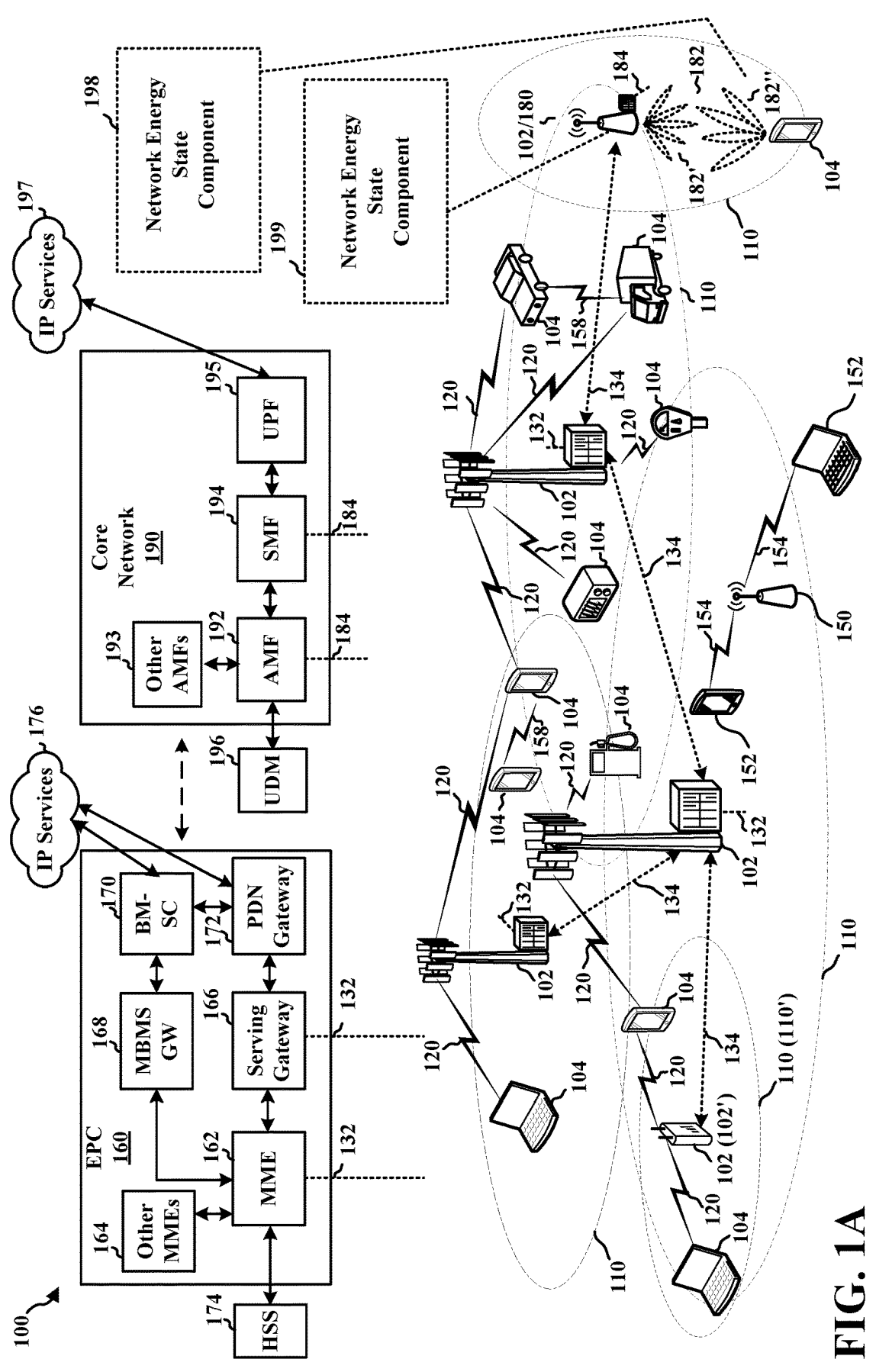
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network energy consumption may contribute significantly to the expense of running a cellular network. In some of the existing techniques for power management, a network entity may reduce energy consumption by reducing number of antenna ports, transmit power, or may dynamically turn a cell on or off based on the network load and/or if the network does not need multiple carriers. However, when the network entity applies these power management techniques and schedules communication of data and/or signal with the UE, the UE may not successfully receive or transmit the indication and/or the scheduled data or signal as the UE may not be configured to detect changes in the network entity power operations.

Accordingly, techniques described herein allow a UE to more efficiently handle reception or transmission of a set of high priority signals or signals associated with high priority channels during time intervals associated with network energy saving modes of a network entity, while reducing power consumption of the network entity and the UE. Additional details of these techniques are described herein with respect to FIGS. 4-12.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system 100 (also referred to as a wireless wide area network (WWAN)) that includes base stations 102 (also referred to herein as network entities), user equipment(s) (UE) 104, an Evolved Packet Core (EPC) 160, and another core network 190 (e.g., a 5G Core (5GC)).

One or more of the UE 104 may include a network energy state component 198, and one or more of the base stations 102/180 (e.g., network entities) may be configured to include a network energy state component 199, wherein the network energy state component 198 and the network energy state component 199 are operable to reduce power consumption and/or increase power management efficiency of UE 104 and base stations 102/180 (e.g., network entities) respectively.

At one or more of the UEs 104, and additionally referring to FIG. 9, the network energy state component 198 includes a receiving component 920 configured to receive a first configuration indicating a scheduled time at which a signal is to be communicated between the UE and a network entity, the scheduled time being within a time interval associated with a first network energy state of the network entity. Further, the receiving component 920 may be configured to receive a second configuration mapping the signal with a second network energy state of the network entity. Further, the receiving component 920 may be configured to receive the signal at the scheduled time while the network entity is in the second network energy state. Further, network energy state component 198 includes a transmitting component 925 configured to transmit the signal at the scheduled time while the network entity is in the second network energy state.

Additional details of the network energy state component 198 and/or any of the foregoing components are provided below, for example, with reference to FIGS. 4-10.

At one or more of the base stations 102/180 (or, network entities), and additionally referring to FIG. 11, the network energy state component 199 includes a transmitting component 1120 configured to transmit a first configuration indicating a scheduled time at which a signal is to be communicated between the base station 102/180 and a UE, the scheduled time being within a time interval associated with a first network energy state of the base station 102/180. Further, the transmitting component 1120 may be configured to transmit a second configuration mapping the signal with a second network energy state of the base station 102/180. Further, the transmitting component 1120 may be configured to transmit the signal at the scheduled time while the base station 102/180 is in the second network energy state. Further, network energy state component 199 includes a receiving component 1125 configured to receive the signal at the scheduled time while the base station 102/180 is in the second network energy state. Additional details of the network energy state component 199 and/or any of the foregoing components are provided below, for example, with reference to FIGS. 4-8, 11, and 12.

The base stations (or network entities) 102 may include macrocells (high power cellular base station) and/or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs. Any of the disaggregated components in the D-RAN and/or O-RAN architectures may be referred to herein as a network entity.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a network entity, gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IOT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IOT may include eNB-IOT (enhanced NB-IOT), FeNB-IOT (further enhanced NB-IOT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 1B:
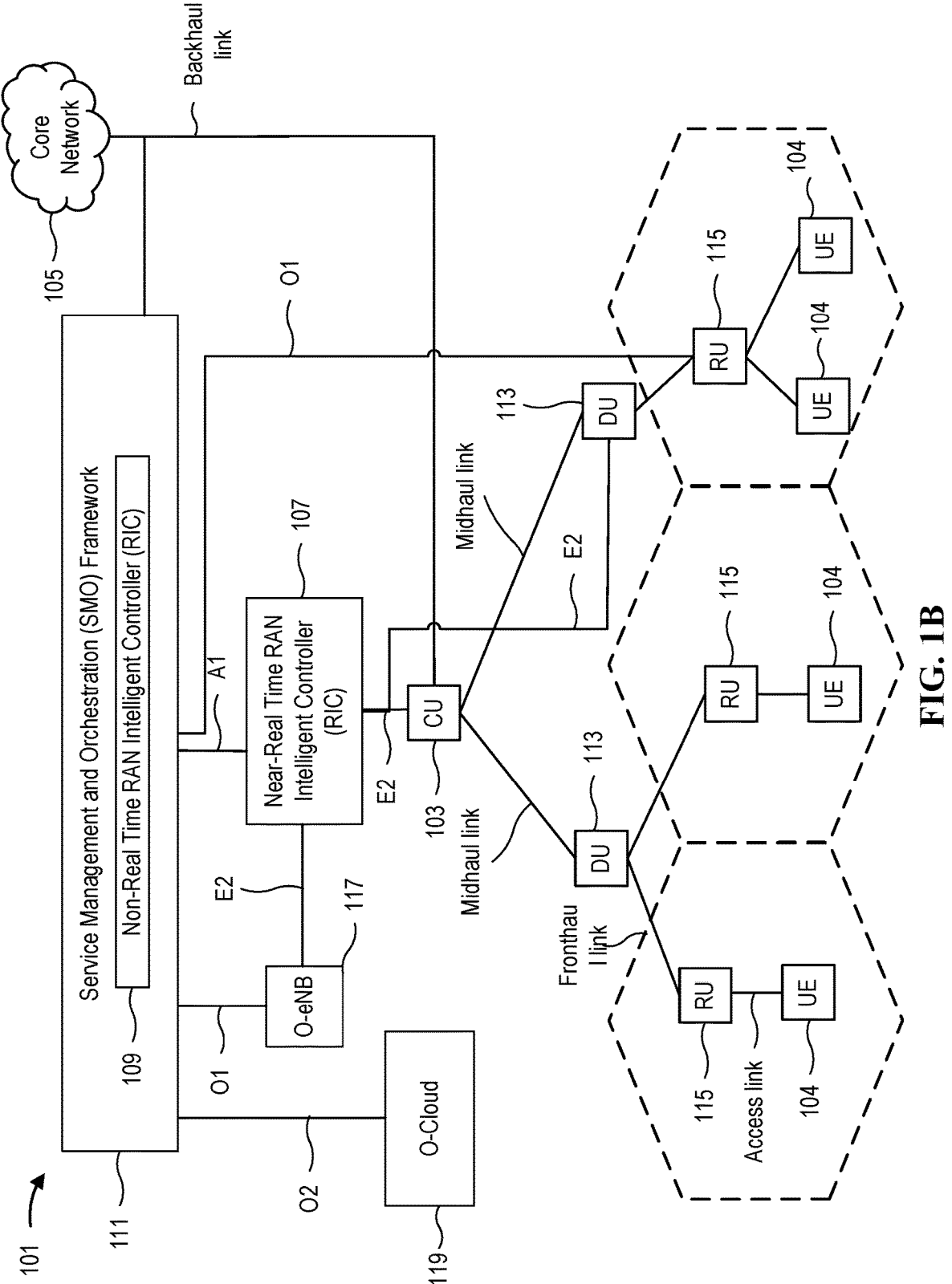
FIG. 1B is a diagram illustrating an example of disaggregated base station architecture, in accordance with various aspects of the present disclosure.

FIG. 1B is a diagram illustrating an example of disaggregated base station 101 architecture, any component or element of which may be referred to herein as a network entity. The disaggregated base station 101 architecture may include one or more central units (CUs) 103 that can communicate directly with a core network 105 via a backhaul link, or indirectly with the core network 105 through one or more disaggregated base station units (such as a Near-Real Time (Near-RT) RAN Intelligent Controller (RIC) 107 via an E2 link, or a Non-Real Time (Non-RT) RIC 109 associated with a Service Management and Orchestration (SMO) Framework 111, or both). A CU 103 may communicate with one or more distributed units (DUs) 113 via respective midhaul links, such as an F1 interface. The DUs 113 may communicate with one or more radio units (RUs) 115 via respective fronthaul links. The RUs 115 may communicate with respective UEs 104 via one or more radio frequency (RF) access links. In some implementations, the UE 104 may be simultaneously served by multiple RUs 115.

Each of the units, e.g., the CUS 103, the DUs 113, the RUs 115, as well as the Near-RT RICs 107, the Non-RT RICs 109 and the SMO Framework 111, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 103 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 103. The CU 103 may be configured to handle user plane functionality (i.e., Central Unit-User Plane (CU-UP)), control plane functionality (i.e., Central Unit-Control Plane (CU-CP)), or a combination thereof. In some implementations, the CU 103 can be logically split into one or more CU-UP units and one or more CU-CP units. The CU-UP unit can communicate bidirectionally with the CU-CP unit via an interface, such as the E1 interface when implemented in an O-RAN configuration. The CU 103 can be implemented to communicate with the DU 113, as necessary, for network control and signaling.

The DU 113 may correspond to a logical unit that includes one or more base station functions to control the operation of one or more RUs 115. In some aspects, the DU 113 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 113 may further host one or more low PHY layers. Each layer (or module) can be implemented with an interface configured to communicate signals with other layers (and modules) hosted by the DU 113, or with the control functions hosted by the CU 103.

Lower-layer functionality can be implemented by one or more RUs 115. In some deployments, an RU 115, controlled by a DU 113, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 115 can be implemented to handle over the air (OTA) communication with one or more UEs 104. In some implementations, real-time and non-real-time aspects of control and user plane communication with the RU(s) 115 can be controlled by the corresponding DU 113. In some scenarios, this configuration can enable the DU(s) 113 and the CU 103 to be implemented in a cloud-based RAN architecture, such as a vRAN architecture.

The SMO Framework 111 may be configured to support RAN deployment and provisioning of non-virtualized and virtualized network elements. For non-virtualized network elements, the SMO Framework 111 may be configured to support the deployment of dedicated physical resources for RAN coverage requirements which may be managed via an operations and maintenance interface (such as an O1 interface). For virtualized network elements, the SMO Framework 111 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 103, DUs 113, RUs 115 and Near-RT RICs 107. In some implementations, the SMO Framework 111 can communicate with a hardware aspect of a 4G RAN, such as an open eNB (O-eNB) 117, via an O1 interface. Additionally, in some implementations, the SMO Framework 111 can communicate directly with one or more RUs 115 via an O1 interface. The SMO Framework 111 also may include a Non-RT RIC 109 configured to support functionality of the SMO Framework 111.

The Non-RT RIC 109 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 107. The Non-RT RIC 109 may be coupled to or communicate with (such as via an A1 interface) the Near-RT RIC 107. The Near-RT RIC 107 may be configured to include a logical function that enables near-real-time control and optimization of RAN elements and resources via data collection and actions over an interface (such as via an E2 interface) connecting one or more CUs 103, one or more DUs 113, or both, as well as an O-eNB, with the Near-RT RIC 107.

In some implementations, to generate AI/ML models to be deployed in the Near-RT RIC 107, the Non-RT RIC 109 may receive parameters or external enrichment information from external servers. Such information may be utilized by the Near-RT RIC 107 and may be received at the SMO Framework 111 or the Non-RT RIC 109 from non-network data sources or from network functions. In some examples, the Non-RT RIC 109 or the Near-RT RIC 107 may be configured to tune RAN behavior or performance. For example, the Non-RT RIC 109 may monitor long-term trends and patterns for performance and employ AI/ML models to perform corrective actions through the SMO Framework 111 (such as reconfiguration via 01) or via creation of RAN management policies (such as A1 policies).

Figures 2A, 2B, 2C, 2D:
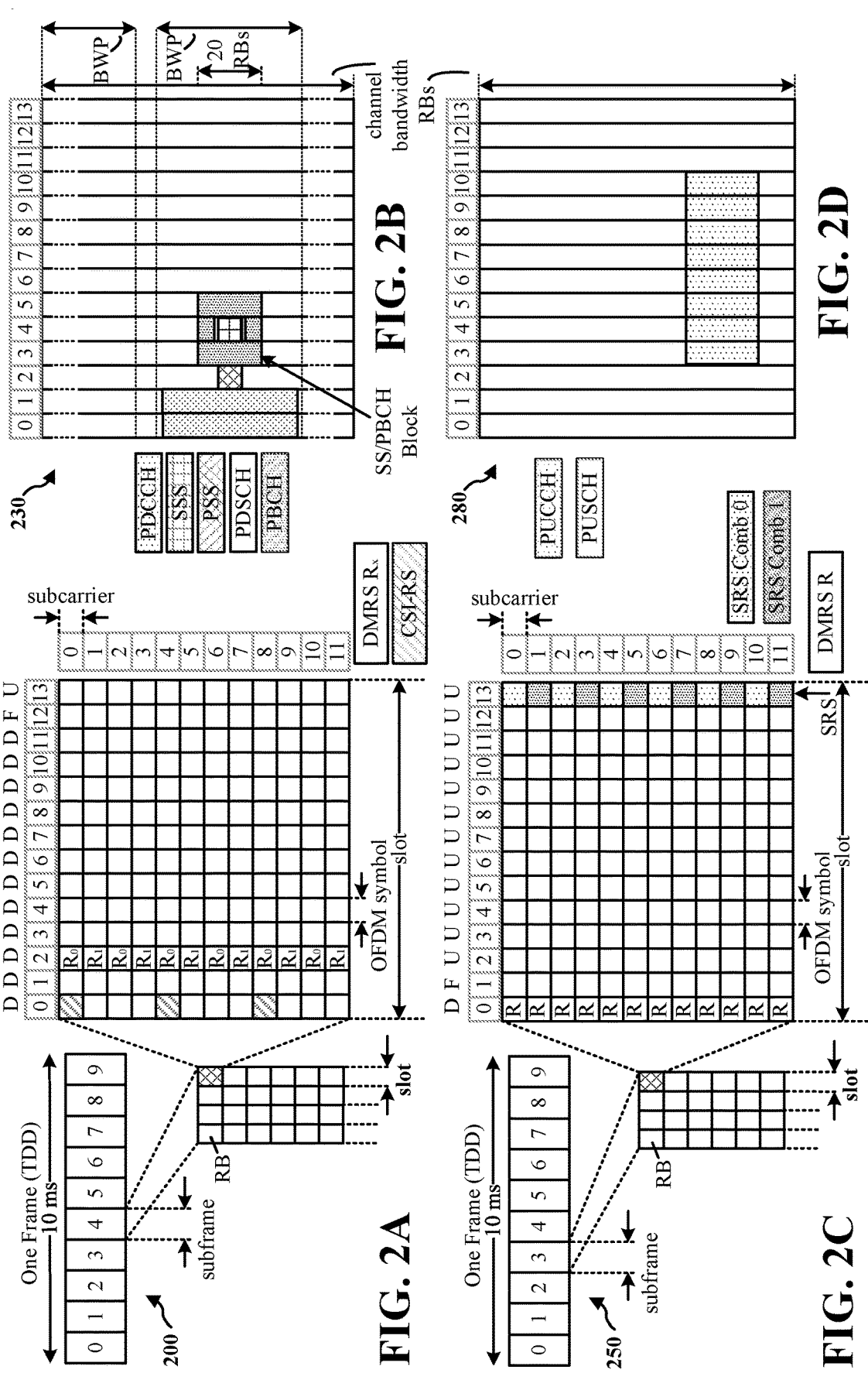
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIGS. 2A-2D are diagrams of various frame structures, resources, and channels used by UEs 104 and base stations 102/180 for communication. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $24*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
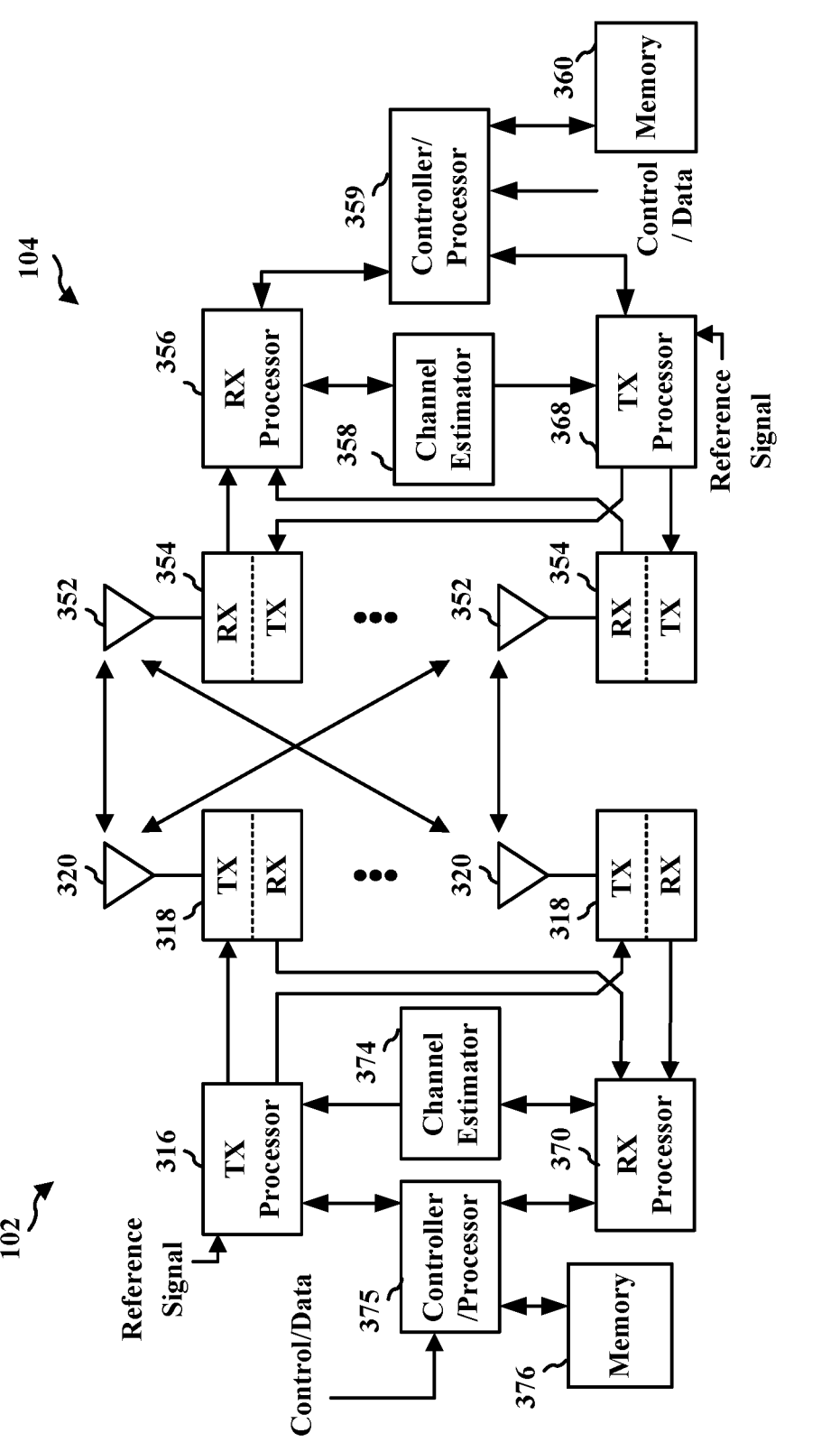
FIG. 3 is a diagram illustrating an example of a base station and user equipment (UE) in an access network.

FIG. 3 is a block diagram of hardware components of the base station 102 (or 180) in communication with the UE 104 in the wireless communication network 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with network energy state component 198 of FIG. 1A.

At least one of the TX processor 316, the RX processor 370, and the controller/processor 375 may be configured to perform aspects in connection with network energy state component 199 of FIG. 1A.

Figure 4:
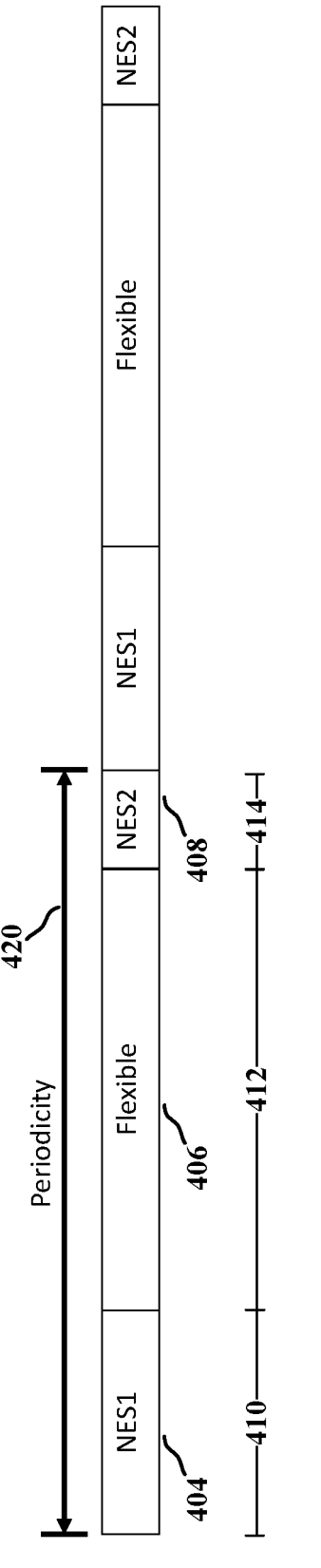
FIG. 4 is a diagram illustrating an example of network energy states of a network entity, in accordance with various aspects of the present disclosure.

Referring to FIG. 4, example 400 shows network energy states of a network entity. The example 400 includes a first network energy state 404, a second network energy state 406, and a third network energy state 408 of a network entity (e.g., base stations 102/180). As described herein, a network energy state may be an operating mode associated with network energy savings of the network entity. Different network energy states may be different operating modes associated with network energy savings of the network entity. Some network energy states may be operating modes that lack network energy savings at the network entity. In some implementations, operating modes that lack network energy savings may be operating modes that not are not associated with any network energy savings of the network entity. In some implementations, operating modes that lack network energy savings may be operating modes where the network entity does not perform operations that reduce cause the network entity to enter any sleep modes. In some implementations, operating modes that lack network energy savings may be operating modes where the network entity transmits at a maximum transmission power. In some implementations, operating modes that lack network energy savings may be operating modes where the network entity does not reduce its antenna ports or antennas.

Some network energy states may be operating modes statically configured for network energy savings at the network entity and may be referred to herein as configured network energy saving states, and some network energy states may be operating modes flexibly or dynamically configured for network energy savings at the network entity, and referred to herein as flexible network energy saving states.

While a network entity is in a configured network energy saving state, the network entity saves energy and/or reduces its power consumption. The network entity may save energy and/or reduce its power consumption by reducing and/or changing its capabilities. Different network energy savings states may save energy and/or reduce power consumption at the network entity. For example, the network entity may reduce and/or change its capabilities by entering a sleep mode, reducing its active antenna ports or antennas, reducing its transmission power, and the like.

While a network entity is in a flexible network energy saving state, the network entity may save energy and/or reduce its power consumption similar to the configured network energy saving state. The network entity may be configured to have the flexibility to change its operation(s) dynamically during the flexible network energy saving state and indicate the operation(s) dynamically to the UE (e.g., via a DCI message, and the like). In some implementations, during a flexible network energy saving state, the network entity may save less energy and/or reduce its power consumption by a lower amount than the configured network energy saving state. For example, during the flexible network energy saving state, the network entity may enter a lighter sleep mode than it would during a configured network energy saving state. Similarly, the network entity may reduce fewer active antenna ports or antennas, or reduce its transmission power by a lesser amount during the flexible network energy saving state than it would during the configured network energy saving state. Alternatively, during a configured network energy saving state, the network entity may save less energy and/or reduce its power consumption by a lower amount than a flexible network energy saving state.

In the example 400 of FIG. 4, the first network energy state 404 may be a configured network energy saving state, the second network energy state 406 may be a flexible network energy saving state, and the third network energy state 408 may be another configured network energy saving state. In some implementations, the configured network energy saving state 404 may be different from the configured network energy saving state 408. The differences between the configured network energy saving states 404 and 408 may include, but are not limited to, time durations or time intervals of these network energy saving states, the amount of energy saved and/or power consumption reduced by the network entity, the capabilities of the network entity, and/or the like. For example, during first network energy state 404, the network entity may enter a deep sleep mode, and during the third network energy state 408, the network entity may enter a light sleep mode. In some implementations, the amount of energy saved in a deep sleep mode may be greater than the amount of energy saved in a light sleep mode. In some implementations, the amount of power consumed by the network entity in a deep sleep mode may be less than the amount of power consumed by the network entity in a light sleep mode. In some implementations, the network entity may reduce more of its active antennas or antenna ports in a deep sleep mode than it reduces in a light sleep mode.

Similarly, the network entity may reduce fewer active antenna ports in third network energy state 408 than in first network energy state 404, but more active antenna ports than in flexible network energy state 406. As another example, the network entity may reduce its transmission power by a lesser amount during third network energy state 408 than during first network energy state 404, but by a greater amount during the flexible network energy state 406.

The network entity may operate in the different network energy states 404, 406, 408 for different periods of time or different time intervals. For example, the network entity may operate in the network energy state 404 for a time interval 410. Similarly, the network entity may operate in the network energy states 406 and 408 for time intervals 412 and 414, respectively. The network entity may operate in the different network entity states 404, 406, 408 with a periodicity. For example, as shown in FIG. 4, the network entity may operate in the different network energy states 404, 406, 408 with a periodicity 420. In example 400 of FIG. 4, after time interval 414 and the end of periodicity 420, the network entity may transition from network energy state 408 to network energy state 404 again.

The network entity may transmit (e.g., via an RRC message) a configuration (e.g., RRC configuration) to the UE 104 indicating the different network energy states 404, 406, 408, and/or their associated time intervals 410, 412, 414, periodicity 420, and other information related to the network energy states 404, 406, 408. In some implementations, the configuration may indicate the capabilities of the network entity in each of the network energy states 404, 406, 408. The UE 104 may determine a current network energy state of the network entity at an associated time interval based on the received configuration.

While the network entity is configured to operate in the different network energy states 404, 406, 408 for their associated time intervals 410, 412, 414, the network entity may handle traffic conditions and/or support different types of UEs. For instance, the network entity may schedule communication (e.g., transmission or reception) of one or more signals (e.g., SSB, etc.) and/or data (e.g., PRACH preamble, high priority UE data, control data, etc.) via one or more channels (PRACH, high priority PDSCH, high priority PUSCH, etc.) during one or more of the time intervals 410, 412, 414 of the network energy states 404, 406, 408, respectively. However, if the network entity is operating in a network energy state while these signals or channels are communicated, communication quality may be reduced. For example, if a network entity is configured to be in a sleep mode or reduce its number of active antennas or transmission power at a scheduled time for an SSB in a PBCH or for a preamble in a RACH (or for some other high priority signal or channel), the likelihood of the UE successfully receiving or transmitting such signal or channel may be significantly reduced.

Accordingly, aspects are provided that allow, at the time of the scheduled communication, the network entity to operate in a different network energy state than a preconfigured network energy state and/or the network energy state indicated via the configuration transmitted to the UE 104. This different network energy state, referred to herein as new network energy state, may override or overwrite a previously configured network energy state to improve the likelihood of successful communication of the scheduled signal or channel at the time of the previously configured network energy state. For example, for a period of time (e.g., one or more slots) associated with the scheduled communication, the network entity may operate in a network energy state that lacks energy savings at the network entity, even though the network entity may have been preconfigured or statically configured or dynamically/flexibly configured to operate in one of the network energy states 404, 406, or 408 during that period of time. Similarly, for the period of time associated with the scheduled communication, the network entity may operate in a different configured or flexible network energy saving state than a configured or flexible network energy state in which the network entity may have been preconfigured or configured to operate.

Moreover, to maximize the likelihood that the UE can successfully communicate (e.g., transmit or receive) scheduled signals and/or data with the network entity during the period of time associated with the scheduled communication, the UE may be configured to determine the changed network energy state of the network entity during the period of time associated with the scheduled communication, and transmit or receive the scheduled signals and/or data while the network entity is operating in the changed network energy state. Additional details of the UE being configured to determine the changes network energy state of the network entity are described below and/or with reference to FIGS. 5-12.

In some implementations, the UE 104 may be configured with a set of rules and/or instructions that indicate that the network entity may be operating in a network energy state that lacks network energy savings (or some other network energy state). An example of such rules and/or instructions may be that if a signal from a defined and/or a preconfigured set of signals, and/or data via a channel from a defined and/or a preconfigured set of channels, is scheduled during a time interval associated with a flexible network energy state, the UE may determine that the network entity has overrode or overwritten its flexible network energy state (or other network energy state) with a network energy state lacking network energy savings (or a different network energy state). The set of signals and/or channels may include, but are not limited to, for example, SSB, PRACH, high priority downlink data channels (e.g., high priority PDSCHs), high priority uplink data channels (e.g., high priority PUSCHs), and the like.

Figure 5:
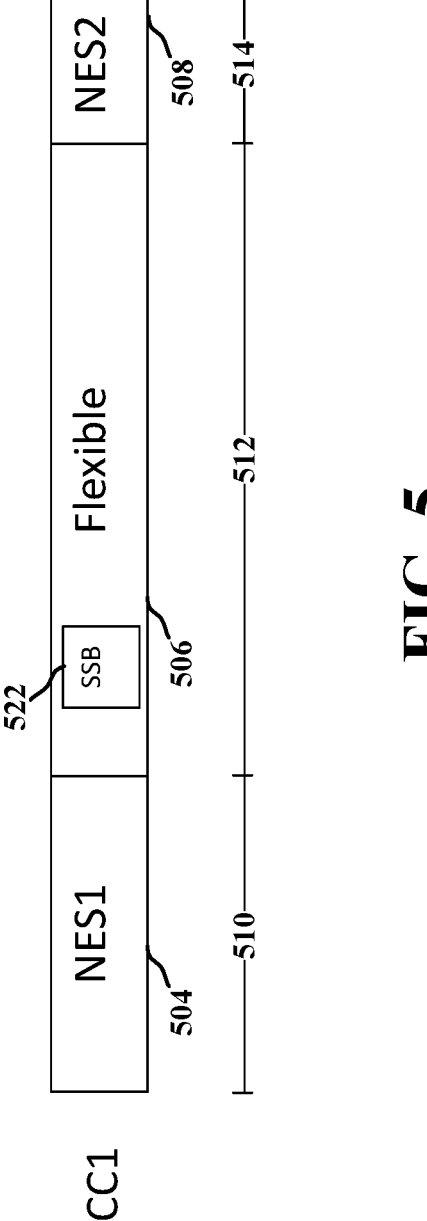
FIG. 5 is a diagram illustrating an example of a scheduled signal during a time interval associated with a network energy state, in accordance with present disclosure.

Referring now to FIG. 5, an example is provided to describe the foregoing. In example 500, there is shown a periodic sequence of network energy states 504, 506, 508 during which the network entity may be configured to operate for the time intervals of 510, 512, 514, respectively. Network energy state 506 may be a flexible network energy state. Network energy states 504, 508 may be configured network energy states. As described above, the UE 104 may receive a configuration from the network entity that indicates such a periodic sequence of network energy states of the network entity. The UE 104 may also receive an indication of a scheduled time at which a signal and/or data 522 is to be communicated (received in downlink or transmitted in uplink) between the UE and the network entity. For example, the UE 104 may receive a configuration that includes scheduling information for an SSB signal from the network entity. In some implementations, the UE 104 may receive the indication of the scheduled time via an RRC configuration, a DCI message, and/or the like.

Based on the indication, the UE 104 may be configured to determine whether the scheduled signal and/or data 522 is a signal from the defined and/or preconfigured set of signals or is scheduled to be communicated via a channel from the set of defined and/or preconfigured set of channels. In the illustrated example, the UE 104 may be configured to determine whether the scheduled time of the signal and/or data 522 is within the time interval 512 associated with the network energy state 506 (flexible network energy state). Based on such determinations and the configuration indicating the set of rules and/or instructions, the UE 104 may be configured to determine a network energy state of the network entity (the overriding network energy state) at least during the period of time associated with the scheduled communication. For example, if the UE determines that the scheduled signal including data 522 is an SSB signal, and that the scheduled time of the signal including data 522 is within the time interval 512 of the network energy state 506, then the UE 104 may be configured to determine that the network entity is operating in a network energy state that lacks network energy savings and not in the network energy state 506.

In some implementations, the UE 104 may determine whether the time interval 512 of the network energy state 506 satisfies a threshold time interval (e.g., the time interval 512 meets or exceeds a certain length of time), and if it satisfies the threshold time interval, the UE 104 may determine whether any other signals from the defined or configured set of signals, and/or data via a channel from the defined and/or preconfigured set of channels, are scheduled during the time interval 512. In some implementations, if the UE 104 determines that no other signals from the defined or configured set of signals, and/or no other data via a channel from the defined and/or preconfigured set of channels, are scheduled during the time interval 512, then the UE may determine that the network entity is operating in a default network energy savings state for the remainder of the time interval 512 after the signal is received. The default network energy savings state may be a flexible network energy saving state, or a different network energy savings state.

In some implementations, the UE 104 may be configured with a set of rules and/or instructions that allow the UE to determine a period of time that the network entity operates in the new network energy state. An example of such rules and/or instructions may be that if a signal from a defined and/or a preconfigured set of signals, and/or data via a channel from a defined and/or a preconfigured set of channels, is scheduled during a time interval associated with a flexible network energy state, the UE may determine that the network entity operates in the new network energy state for X number of slots associated with the scheduled signal or data scheduled via the channel. In some implementations, the X number of slots may be from the starting slot associated with the signal and/or the channel until the last slot associated with the signal and/or the channel. In some implementations, the X number of slots may be from the starting slot associated with the signal and/or the channel until the slot associated with the signal and/or the channel that includes a transmission of a HARQ-ACK. The HARQ-ACK may be associated with the signal and/or data communicated via the channel. In some implementations, the rules and/or instructions may indicate that the network operates in the new energy state for the remainder of the time interval associated with the configured or overridden or overwritten network energy state.

Figure 6:
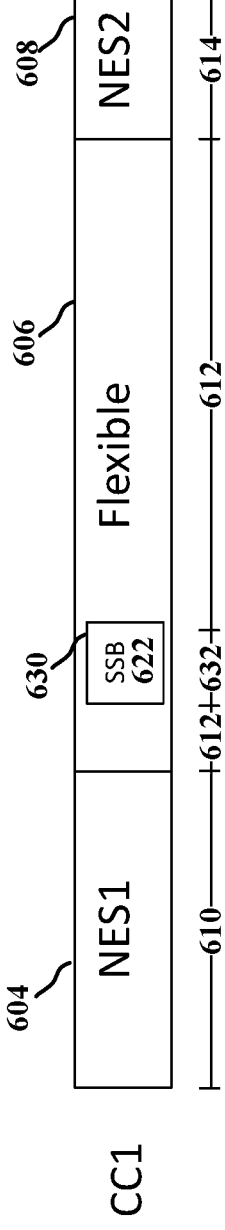
FIG. 6 is a diagram illustrating another example of receiving a scheduled signal during a time interval associated with a network energy state, in accordance with present disclosure.

Referring now to FIG. 6, an example is provided to describe the foregoing. In example 600, there is shown a periodic sequence of network energy states 604, 606, 608, 630 during which the network entity may be configured to operate for the time intervals of 610, 612, 614, 632, respectively. Network energy state 606 may be a flexible network energy state. Network energy state 630 is the new network energy state. As described above, the new network energy state may be a configured network energy state, a state that lacks network energy savings at the network entity, or another flexible network state. In the example 600, the new network energy state 630 may be a configured as the network energy state that lacks network energy savings at the network entity. Network energy states 604, 608 may be configured network energy states. As described above, the UE 104 may receive a configuration from the network entity that indicates such a periodic sequence of network energy states of the network entity, and/or an indication of a scheduled time at which a signal (e.g., an SSB signal) and/or data 622 is to be communicated (received in downlink or transmitted in uplink) between the UE 104 and the network entity.

As described above, the UE 104 may determine whether the network entity is operating in the new energy state. Based on the determination that the network entity is operating in the new energy state, the UE 104 may determine a period of time the network entity operates in the new network energy state. The UE 104 may determine the period of time based on the set of rules and/or instructions described above. For, example, based on above described the rules and/or instructions, the UE 104 may determine that the network entity operates in the new network energy state for X number of slots, where the X number of slots are within and/or span at least a portion the time interval 612. In some implementations, based on the above described rules and/or instructions, the UE 104 may determine the X number of slots based on a starting slot and a last slot associated with the signal and/or data 622. In some implementations, the UE 104 may determine that the network entity operates in the new network energy state from the starting slot associated with the signal and/or data 622 and until the last slot associated with the signal and/or data 622. In some implementations, the UE 104 may determine that the network entity operates in the new network energy state from the starting slot associated with the signal and/or data 622 and until a last slot that transmits a HARQ-ACK associated with the signal and/or data 622.

The UE 104, in some implementations, may determine that the network entity operates in the new energy state 630 for the remainder of the time interval 612 based on the above described rules and/or instructions. For example, the UE 104 may determine that the time interval 632 associated with the network energy state 630 overlaps the time interval 612 associated with the network energy state 606. In some implementations, the UE 104 may determine that the network entity operates in the new network energy state 630 from the starting slot associated with the signal and/or data 622 and until a last slot associated with the time interval 612.

In some implementations, the UE 104 may be configured with a set of rules and/or instructions that indicate that the network entity may be operating in a network energy state that lacks network energy savings (or some other network energy state). An example of such rules and/or instructions may be that if a signal from a defined and/or a preconfigured set of signals, and/or data via a channel from a defined and/or a preconfigured set of channels, is scheduled during a time interval associated with a configured network energy state, the UE may determine that the network entity has overrode or overwritten its configured network energy state (or other network energy state) with a network energy state lacking network energy savings (or a different network energy state). As described above, the set of signals and/or channels may include, but are not limited to, for example, SSB, PRACH, high priority downlink data channels (e.g., high priority PDSCHs), high priority uplink data channels (e.g., high priority PUSCHs), and the like.

Referring now to FIG. 7, an example is provided to describe the foregoing. In example 700, there is shown a periodic sequence of network energy states 704, 706, 730 during which the network entity may be configured to operate for the time intervals of 710, 712, 732, respectively. Network energy states 704, 706 may be configured network energy states.

As described above, the UE 104 may receive a configuration from the network entity that indicates such a periodic sequence of network energy states of the network entity. The UE 104 may also receive an indication of a scheduled time at which a signal (e.g., SSB) and/or data 722 is to be communicated between the UE and the network entity.

Based on the indication, the UE 104 may be configured to determine whether the scheduled signal and/or data 722 is a signal from the defined and/or preconfigured set of signals or is scheduled to be communicated via a channel from the set of defined and/or preconfigured set of channels. In the illustrated example, the UE 104 may be configured to determine whether the scheduled time of the signal and/or data 722 is within the time interval 712 associated with the network energy state 706 (configured network energy state). Based on such determinations and the configuration indicating the set of rules and/or instructions, the UE 104 may be configured to determine a network energy state 730 of the network entity (the overriding network energy state) at least during the period of time associated with the scheduled communication. For example, if the UE determines that the scheduled signal including data 722 is an SSB signal, and that the scheduled time of the signal including data 722 is within the time interval 712 of the network energy state 706, then the UE 104 may be configured to determine that the network entity is operating in the new network energy state 730 that lacks network energy savings and not in the network energy state 706. Network energy state 730 is the new network energy state. As described above, the new network energy state may be a configured network energy state, a state that lacks network energy savings at the network entity, or another flexible network state. In the example 700, the new network energy state 730 may be a configured as the network energy state that lacks network energy savings at the network entity.

Thus, the techniques described herein allow for successful processing and/or communication of a defined and/or predefined set of signals and/or data from a defined and/or predefined set of channels during configured network energy states.

Figure 8:
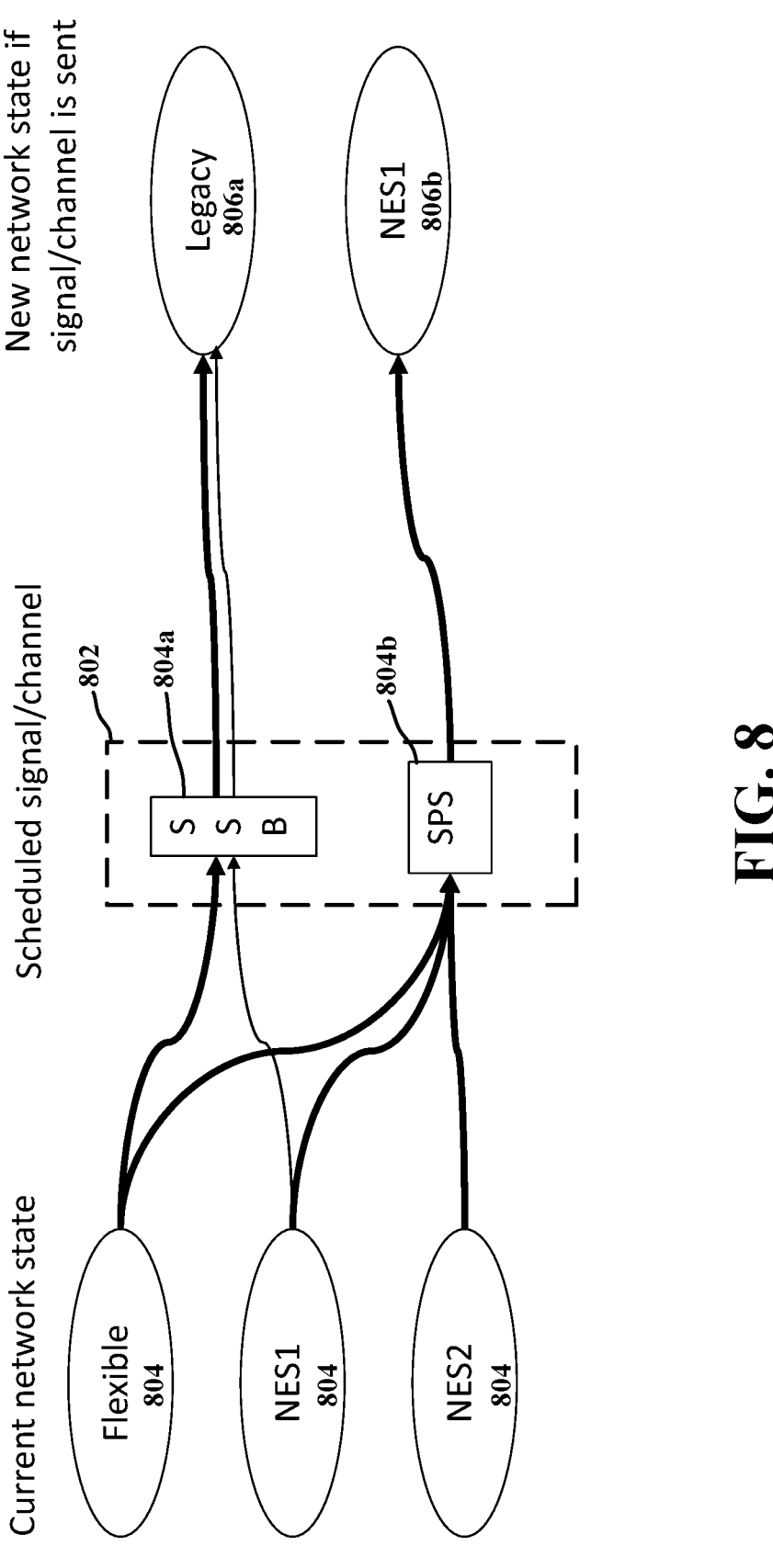
FIG. 8 is a diagram illustrating an example mapping between a set of signals and/or channels and various network energy states, in accordance with present disclosure.

In some implementations, the UE 104 may be configured with a mapping that indicate and/or map a set of channels and/or signals to a set of network energy states. Referring now to FIG. 8, an example is provided to describe such a mapping. In example 800 of FIG. 8, there is shown an example of a mapping that maps and/or indicates, for each signal and/or channel 804a, 804b in the set of signals and/or channels 802, a set of new network energy states 806a, 806b for the network entity based on a defined and/or preconfigured network energy state 804.

Based on the indication, the UE 104 may be configured to determine whether a scheduled signal and/or a channel via which data scheduled for communication is one of signals and/or channels within the set of signals and/or channels 802. Based on such determinations and the mapping, the UE 104 may be configured to determine a network energy state 806 of the network entity (the overriding network energy state) at least during a period of time associated with a scheduled communication of a signal within the set of signals and/or channels 802, and/or scheduled communication of data via channel within the set of channels 802.

Referring to example 900 of FIG. 9 and FIG. 10, in operation, UE 104 may perform a method 1000 of wireless communication, by such as via execution of network energy state component 198 by processor 905 and/or memory 360 (FIG. 3). In this case, the processor 905 may be the receive (rx) processor 356, the controller/processor 359, and/or the transmit (tx) processor 368 described above in FIG. 3.

At block 1002, the method 1000 includes receiving a first configuration indicating a scheduled time at which a signal is to be communicated between the UE and a network entity, the scheduled time being within a time interval associated with a first network energy state of the network entity. For example, in an aspect, UE 104, processor 905, memory 360, network energy state component 198, and/or receiving component 920 may be configured to or may comprise means for receiving a first configuration indicating a scheduled time at which a signal is to be communicated between the UE and a network entity, the scheduled time being within a time interval associated with a first network energy state of the network entity.

For example, the receiving at block 1002 may include receiving the first configuration via a wireless signal at an antenna or antenna array (e.g., antenna 352) as described in FIG. 3, and processing the received wireless signal and the first configuration as described above.

At block 1004, the method 1000 includes receiving a second configuration mapping the signal with a second network energy state of the network entity. For example, in an aspect, UE 104, processor 905, memory 360, network energy state component 198, and/or receiving component 920 may be configured to or may comprise means for receiving a second configuration mapping the signal with a second network energy state of the network entity.

For example, the receiving at block 1004 may include receiving the second configuration via a wireless signal at an antenna or antenna array (e.g., antenna 352) as described in FIG. 3, and processing the received wireless signal and the second configuration as described above.

At block 1006, the method 1000 includes receiving or transmitting the signal at the scheduled time while the network entity is in the second network energy state based on the second configuration. For example, in an aspect, UE 104, processor 905, memory 360, network energy state component 198, and/or receiving component 920 may be configured to or may comprise means for receiving or transmitting the signal at the scheduled time while the network entity is in the second network energy state based on the second configuration.

For example, the receiving at block 1006 may include receiving or transmitting the signal at the scheduled time via a wireless signal at an antenna or antenna array (e.g., antenna 352) as described in FIG. 3, and processing the received wireless signal as described above.

In an alternative or additional aspect, the second network energy state is a mode indicating a lack of network energy savings at the network entity.

In an alternative or additional aspect, the network entity is in the second network energy state during a portion of the time interval.

In an alternative or additional aspect, the portion of the time interval is from a first scheduled slot associated with the signal until a last scheduled slot associated with the signal, the first scheduled slot including the scheduled time.

In an alternative or additional aspect, the portion of the time interval is from a first scheduled slot associated with the signal until a last scheduled slot associated with the signal, the last scheduled slot including a transmission of a Hybrid Automatic Repeat Request Acknowledgement (HARQ-ACK) associated with the signal.

In an alternative or additional aspect, the network entity is in the second network energy state during an entirety of the time interval.

In an alternative or additional aspect, the first network energy state is a configured network energy saving mode and the second network energy state is a mode indicating a lack of network energy savings at the network entity.

In an alternative or additional aspect, the first network energy state is a first configured network energy saving mode and the second network energy state is a second configured network energy saving mode.

In an alternative or additional aspect, the first network energy state is a flexible network energy saving mode and the second network energy state is a mode indicating a lack of network energy savings at the network entity.

In an alternative or additional aspect, the first network energy state is a flexible network energy saving mode and the second network energy state is a configured network energy saving mode.

In an alternative or additional aspect, the second network energy state is different than the first network energy state.

Referring to FIG. 11, in an alternative or additional aspect, at block 1102, the method 1000 may further include receiving a third configuration indicating a periodic sequence of network energy states and a time granularity respectively associated with the periodic sequence of network energy states, the periodic sequence of network energy states including the first network energy state, and the time interval being at least a portion of the time granularity. For example, in an aspect, UE 104, processor 905, memory 360, network energy state component 198, and/or receiving component 920 may be configured to or may comprise means for receiving a third configuration indicating a periodic sequence of network energy states and a time granularity respectively associated with the periodic sequence of network energy states, the periodic sequence of network energy states including the first network energy state, and the time interval being at least a portion of the time granularity.

For example, the receiving at block 1102 may include receiving the third configuration via a wireless signal at an antenna or antenna array (e.g., antenna 352) as described in FIG. 3, and processing the received wireless signal and the third configuration as described above.

Referring to FIG. 12, in an alternative or additional aspect, at block 1202, the method 1000 may further include, receiving a third configuration via a DCI, wherein the third configuration indicates the first network energy state. For example, in an aspect, UE 104, processor 905, memory 360, network energy state component 198, and/or receiving component 920 may be configured to or may comprise means for receiving a third configuration via a DCI, wherein the third configuration indicates the first network energy state.

For example, the receiving at block 1202 may include receiving the third configuration via a wireless signal at an antenna or antenna array (e.g., antenna 352) as described in FIG. 3, and processing the received wireless signal and the third configuration as described above.

Figure 13:
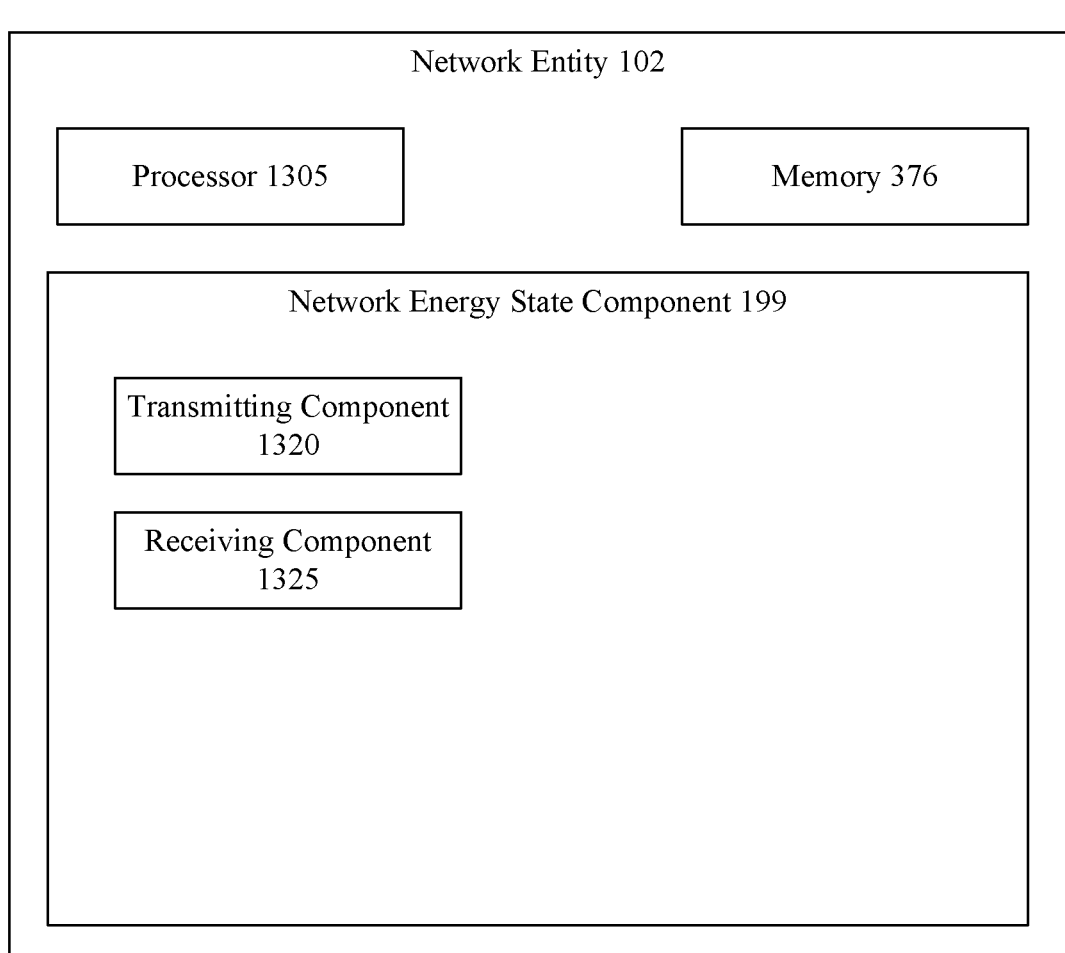
FIG. 13 is a diagram illustrating another example of a hardware implementation for another example apparatus.

Referring to example 1300 of FIG. 13 and FIG. 14, in operation, network entity 102 may perform a method 1400 of wireless communication, by such as via execution of network energy state component 199 by processor 1305 and/or memory 376 (FIG. 3). In this case, the processor 1305 may be the receive (rx) processor 370, the controller/processor 375, and/or the transmit (tx) processor 316 described above in FIG. 3.

At block 1402, the method 1400 includes transmitting a first configuration indicating a scheduled time at which a signal is to be communicated between a UE and the network entity, the scheduled time being within a time interval associated with a first network energy state of the network entity. For example, in an aspect, network entity 102, processor 1305, memory 376, network energy state component 199, and/or transmitting component 1320 may be configured to or may comprise means for transmitting a first configuration indicating a scheduled time at which a signal is to be communicated between a UE and the network entity, the scheduled time being within a time interval associated with a first network energy state of the network entity.

For example, the transmitting at block 1402 may include transmitting the first configuration via a wireless signal at an antenna or antenna array (e.g., antenna 320) as described in FIG. 3.

At block 1404, the method 1400 includes transmitting a second configuration mapping the signal with a second network energy state of the network entity. For example, in an aspect, network entity 102, processor 1305, memory 376, network energy state component 199, and/or transmitting component 1320 may be configured to or may comprise means for transmitting a second configuration mapping the signal with a second network energy state of the network entity.

For example, the transmitting at block 1404 may include transmitting the second configuration via a wireless signal at an antenna or antenna array (e.g., antenna 320) as described in FIG. 3.

At block 1406, the method 1400 includes transmitting or receiving the signal at the scheduled time while the network entity is in the second network energy state based on the second configuration. For example, in an aspect, network entity 102, processor 1305, memory 376, network energy state component 199, and/or transmitting component 1320 or receiving component 1325 may be configured to or may comprise means for transmitting or receiving the signal at the scheduled time while the network entity is in the second network energy state based on the second configuration.

For example, the transmitting or receiving at block 1406 may include transmitting or receiving the signal at the scheduled time via a wireless signal at an antenna or antenna array (e.g., antenna 320) as described in FIG. 3, and processing the received wireless signal as described above.

In an alternative or additional aspect, the second network energy state is a mode indicating a lack of network energy savings at the network entity.

In an alternative or additional aspect, the network entity is in the second network energy state during a portion of the time interval.

In an alternative or additional aspect, the portion of the time interval is from a first scheduled slot associated with the signal until a last scheduled slot associated with the signal, the first scheduled slot including the scheduled time.

In an alternative or additional aspect, the portion of the time interval is from a first scheduled slot associated with the signal until a last scheduled slot associated with the signal, the last scheduled slot including a transmission of a Hybrid Automatic Repeat Request Acknowledgement (HARQ-ACK) associated with the signal.

In an alternative or additional aspect, the network entity is in the second network energy state during an entirety of the time interval.

In an alternative or additional aspect, the first network energy state is a configured network energy saving mode and the second network energy state is a mode indicating a lack of network energy savings at the network entity.

In an alternative or additional aspect, the first network energy state is a first configured network energy saving mode and the second network energy state is a second configured network energy saving mode.

In an alternative or additional aspect, the first network energy state is a flexible network energy saving mode and the second network energy state is a mode indicating a lack of network energy savings at the network entity.

In an alternative or additional aspect, the first network energy state is a flexible network energy saving mode and the second network energy state is a configured network energy saving mode.

In an alternative or additional aspect, the second network energy state is different than the first network energy state.

Referring to FIG. 15, in an alternative or additional aspect, at block 1502, the method 1400 may further include transmitting a third configuration indicating a periodic sequence of network energy states and a time granularity respectively associated with the periodic sequence of network energy states, the periodic sequence of network energy states including the first network energy state, and the time interval being at least a portion of the time granularity. For example, in an aspect, network entity 102, processor 1305, memory 376, network energy state component 199, and/or transmitting component 1320 may be configured to or may comprise means for transmitting a third configuration indicating a periodic sequence of network energy states and a time granularity respectively associated with the periodic sequence of network energy states, the periodic sequence of network energy states including the first network energy state, and the time interval being at least a portion of the time granularity.

For example, the transmitting at block 1502 may include transmitting the third configuration via a wireless signal at an antenna or antenna array (e.g., antenna 320) as described in FIG. 3, and processing the received wireless signal and the third configuration as described above.

Referring to FIG. 16, in an alternative or additional aspect, at block 1602, the method 1400 may further include, transmitting a third configuration via a DCI, wherein the third configuration indicates the first network energy state. For example, in an aspect, network entity 102, processor 1305, memory 376, network energy state component 199, and/or transmitting component 1320 may be configured to or may comprise means for transmitting a third configuration via a DCI, wherein the third configuration indicates the first network energy state.

For example, the transmitting at block 1602 may include transmitting the third configuration via a wireless signal at an antenna or antenna array (e.g., antenna 320) as described in FIG. 3, and processing the received wireless signal and the third configuration as described above.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving a first configuration indicating a scheduled time at which a signal is to be communicated between the UE and a network entity, the scheduled time being within a time interval associated with a first network energy state of the network entity; receiving a second configuration mapping the signal with a second network energy state of the network entity; and receiving or transmitting the signal at the scheduled time while the network entity is in the second network energy state based on the second configuration.

Example 2 is the method of example 1, wherein the second network energy state is a mode indicating a lack of network energy savings at the network.

Example 3 is the method of example 1, wherein the network entity is in the second network energy state during a portion of the time interval.

Example 4 is the method of example 3, wherein the portion of the time interval is from a first scheduled slot associated with the signal until a last scheduled slot associated with the signal, the first scheduled slot including the scheduled time.

Example 5 is the method of example 3, wherein the portion of the time interval is from a first scheduled slot associated with the signal until a last scheduled slot associated with the signal, the last scheduled slot including a transmission of a Hybrid Automatic Repeat Request Acknowledgement (HARQ-ACK) associated with the signal.

Example 6 is the method of example 1, wherein the network entity is in the second network energy state during an entirety of the time interval.

Example 7 is the method of example 1, wherein the first network energy state is a configured network energy saving mode and the second network energy state is a mode indicating a lack of network energy savings at the network entity.

Example 8 is the method of example 1, wherein the first network energy state is a first configured network energy saving mode and the second network energy state is a second configured network energy saving mode.

Example 9 is the method of example 1, wherein the first network energy state is a flexible network energy saving mode and the second network energy state is a mode indicating a lack of network energy savings at the network entity.

Example 10 is the method of example 1, wherein the first network energy state is a flexible network energy saving mode and the second network energy state is a configured network energy saving mode.

Example 11 is the method of example 1, wherein the second network energy state is different than the first network energy state.

Example 12 is the method of example 1, further comprising: receiving a third configuration indicating a periodic sequence of network energy states and a time granularity respectively associated with the periodic sequence of network energy states, the periodic sequence of network energy states including the first network energy state, and the time interval being at least a portion of the time granularity.

Example 13 is the method of example 1, further comprising: receiving a third configuration via a DCI, wherein the third configuration indicates the first network energy state.

Example 14 is a method of wireless communication at a network entity, comprising: transmitting a first configuration indicating a scheduled time at which a signal is to be communicated between a User Equipment (UE) and the network entity, the scheduled time being within a time interval associated with a first network energy state of the network entity; transmitting a second configuration mapping the signal with a second network energy state of the network entity; and transmitting or receiving the signal at the scheduled time while the network entity is in the second network energy state based on the second configuration.

Example 15 is the method of example 14, wherein the second network energy state is a mode indicating a lack of network energy savings at the network.

Example 16 is the method of example 14, wherein the network entity is in the second network energy state during a portion of the time interval.

Example 17 is the method of example 16, wherein the portion of the time interval is from a first scheduled slot associated with the signal until a last scheduled slot associated with the signal, the first scheduled slot including the scheduled time.

Example 18 is the method of example 16, wherein the portion of the time interval is from a first scheduled slot associated with the signal until a last scheduled slot associated with the signal, the last scheduled slot including a transmission of a Hybrid Automatic Repeat Request Acknowledgement (HARQ-ACK) associated with the signal.

Example 19 is the method of example 14, wherein the network entity is in the second network energy state during an entirety of the time interval.

Example 20 is the method of example 14, wherein the first network energy state is a configured network energy saving mode and the second network energy state is a mode indicating a lack of network energy savings at the network entity.

Example 21 is the method of example 14, wherein the first network energy state is a first configured network energy saving mode and the second network energy state is a second configured network energy saving mode.

Example 22 is the method of example 14, wherein the first network energy state is a flexible network energy saving mode and the second network energy state is a mode indicating a lack of network energy savings at the network entity.

Example 23 is the method of example 14, wherein the first network energy state is a flexible network energy saving mode and the second network energy state is a configured network energy saving mode.

Example 24 is the method of example 14, wherein the second network energy state is different than the first network energy state.

Example 25 is the method of example 14, further comprising: transmitting a third configuration indicating a periodic sequence of network energy states and a time granularity respectively associated with the periodic sequence of network energy states, the periodic sequence of network energy states including the first network energy state, and the time interval being at least a portion of the time granularity.

Example 26 is the method of example 14, further comprising: transmitting a third configuration via a DCI, wherein the third configuration indicates the first network energy state.

Example 27 is an apparatus for wireless communications, comprising means for performing a method in accordance with any one of examples 1-13.

Example 28 is an apparatus for wireless communications, comprising means for performing a method in accordance with any one of examples 14-26.

Example 29 is a non-transitory computer-readable medium comprising instructions that, when executed by an apparatus, causes the apparatus to perform a method in accordance with any one of examples 1-13.

Example 30 is a non-transitory computer-readable medium comprising instructions that, when executed by an apparatus, cause the apparatus to perform a method in accordance with any one of examples 14-26.

Example 31 is an apparatus for wireless communications, comprising: a memory comprising instructions; and one or more processors configured to execute the instructions to cause the apparatus to perform a method in accordance with any one of examples 1-13.

Example 32 is apparatus for wireless communications, comprising: a memory comprising instructions; and one or more processors configured to execute the instructions to cause the apparatus to perform a method in accordance with any one of examples 14-26.

What is claimed is:

1. An apparatus for wireless communication, comprising:
one or more processors;
at least one memory coupled with the one or more processors; and
instructions stored in the at least one memory, when executed by the one or more processors, cause the apparatus to:

receive a first configuration indicating a scheduled time at which a signal is to be communicated between the apparatus and a network entity, the scheduled time being within a time interval associated with a first network energy state of the network entity;
receive a second configuration mapping the signal with a second network energy state of the network entity; and
receive or transmit the signal at the scheduled time while the network entity is in the second network energy state based on the second configuration,
wherein the network entity is in the second network energy state during a portion of the time interval.

2. The apparatus of claim 1, wherein the second network energy state is a mode indicating a lack of network energy savings at the network entity.

3. The apparatus of claim 1, wherein the portion of the time interval is from a first scheduled slot associated with the signal until a last scheduled slot associated with the signal, the first scheduled slot including the scheduled time.

4. The apparatus of claim 1, wherein the portion of the time interval is from a first scheduled slot associated with the signal until a last scheduled slot associated with the signal, the last scheduled slot including a transmission of a Hybrid Automatic Repeat Request Acknowledgement (HARQ-ACK) associated with the signal.

5. The apparatus of claim 1, wherein the first network energy state is a configured network energy saving mode and the second network energy state is a mode indicating a lack of network energy savings at the network entity.

6. The apparatus of claim 1, wherein the first network energy state is a first configured network energy saving mode and the second network energy state is a second configured network energy saving mode.

7. The apparatus of claim 1, wherein the first network energy state is a flexible network energy saving mode and the second network energy state is a mode indicating a lack of network energy savings at the network entity.

8. The apparatus of claim 1, wherein the first network energy state is a flexible network energy saving mode and the second network energy state is a configured network energy saving mode.

9. The apparatus of claim 1, wherein the second network energy state is different than the first network energy state.

10. The apparatus of claim 1, wherein the instructions, when executed by the one or more processors, further cause the apparatus to:
receive a third configuration indicating a periodic sequence of network energy states and a time granularity respectively associated with the periodic sequence of network energy states, the periodic sequence of network energy states including the first network energy state, and the time interval being at least a portion of the time granularity.

11. The apparatus of claim 1, wherein the instructions, when executed by the one or more processors, further cause the apparatus to:
receive a third configuration via a downlink control information (DCI), wherein the third configuration indicates the first network energy state.

12. An apparatus for wireless communication, comprising:
one or more processors;
at least one memory coupled with the one or more processors; and instructions stored in the at least one memory, when executed by the one or more processors, cause the apparatus to:

transmit a first configuration indicating a scheduled time at which a signal is to be communicated between a User Equipment (UE) and the apparatus, the scheduled time being within a time interval associated with a first network energy state of the apparatus;

transmit a second configuration mapping the signal with a second network energy state of the apparatus; and transmit or receive the signal at the scheduled time while the apparatus is in the second network energy state based on the second configuration;

wherein the apparatus is in the second network energy state during a portion of the time interval.

13. The apparatus of claim 12, wherein the second network energy state is a mode indicating a lack of network energy savings at the apparatus.

14. The apparatus of claim 12, wherein the portion of the time interval is from a first scheduled slot associated with the signal until a last scheduled slot associated with the signal, the first scheduled slot including the scheduled time.

15. The apparatus of claim 12, wherein the portion of the time interval is from a first scheduled slot associated with the signal until a last scheduled slot associated with the signal, the last scheduled slot including a transmission of a Hybrid Automatic Repeat Request Acknowledgement (HARQ-ACK) associated with the signal.

16. The apparatus of claim 12, wherein the first network energy state is a configured network energy saving mode and the second network energy state is a mode indicating a lack of network energy savings at the apparatus.

17. The apparatus of claim 12, wherein the first network energy state is a first configured network energy saving mode and the second network energy state is a second configured network energy saving mode.

18. The apparatus of claim 12, wherein the first network energy state is a flexible network energy saving mode and the second network energy state is a mode indicating a lack of network energy savings at the apparatus.

19. The apparatus of claim 12, wherein the first network energy state is a flexible network energy saving mode and the second network energy state is a configured network energy saving mode.

20. The apparatus of claim 12, wherein the second network energy state is different than the first network energy state.

21. The apparatus of claim 12, wherein the instructions, when executed by the one or more processors, further cause the apparatus to:

transmit a third configuration indicating a periodic sequence of network energy states and a time granularity respectively associated with the periodic sequence of network energy states, the periodic sequence of network energy states including the first network energy state, and the time interval being at least a portion of the time granularity.

22. The apparatus of claim 12, wherein the instructions, when executed by the one or more processors, further cause the apparatus to:

transmit a third configuration via a downlink control information (DCI), wherein the third configuration indicates the first network energy state.

23. A method of wireless communication at a user equipment (UE), comprising:

receiving a first configuration indicating a scheduled time at which a signal is to be communicated between the UE and a network entity, the scheduled time being within a time interval associated with a first network energy state of the network entity;

receiving a second configuration mapping the signal with a second network energy state of the network entity; and receiving or transmitting the signal at the scheduled time while the network entity is in the second network energy state based on the second configuration;

wherein the network entity is in the second network energy state during a portion of the time interval.

24. The method of claim 23, wherein the second network energy state is a mode indicating a lack of network energy savings at the network entity.

25. A method of wireless communication at a network entity, comprising:

transmitting a first configuration indicating a scheduled time at which a signal is to be communicated between a User Equipment (UE) and the network entity, the scheduled time being within a time interval associated with a first network energy state of the network entity;

transmitting a second configuration mapping the signal with a second network energy state of the network entity; and transmitting or receiving the signal at the scheduled time while the network entity is in the second network energy state based on the second configuration;

wherein the network entity is in the second network energy state during a portion of the time interval.

26. The method of claim 25, wherein the second network energy state is a mode indicating a lack of network energy savings at the network entity.

* * * * *